Figure 1:
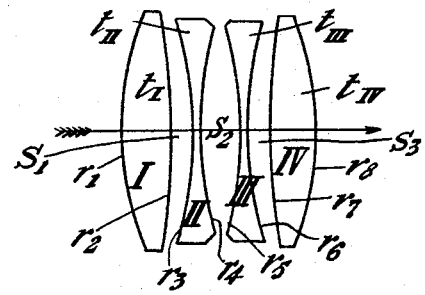

A. WARMISHAM.
LENS.
APPLICATION FILED JAN. 7, 1918.

1,361,207. Patented Dec. 7, 1920.

Inventor
Arthur Warmisham

UNITED STATES PATENT OFFICE.

ARTHUR WARMISHAM, OF LEICESTER, ENGLAND, ASSIGNOR TO TAYLOR, TAYLOR & HOBSON LTD., OF LEICESTER, ENGLAND.

LENS.

1,361,207.   Specification of Letters Patent.   Patented Dec. 7, 1920.

Application filed January 7, 1918. Serial No. 210,705.

*To all whom it may concern:*

Be it known that I, ARTHUR WARMISHAM, M. Sc., a subject of the King of Great Britain, residing in Leicester, England, optician, have invented certain new and useful Improvements in Lenses, of which the following is a specification.

This invention relates to an improved photographic objective corrected spherically, chromatically, astigmatically and comatically, of the type consisting of four simple lenses separated from one another by air spaces, the two halves being unsymmetrical and each half consisting of a positive lens of crown glass of high refractive index and a negative lens, and the space between the positive and the negative being of the shape of a positive meniscus.

Objectives of this type are constructed on the principles discovered by Mr. H. D. Taylor and described by him in British patent specifications Nos. 22607 of 1893 and 15107 of 1895. A symmetrical four-lens objective was described in British specification No. 12859 of 1898. The symmetrical type has obvious advantages from the manufacturer's point of view, but calculation shows that it will not yield a first-class objective of large field and wide aperture.

Recent investigators of objectives consisting of four simple lenses have discarded the symmetrical type. British patent specification No. 22400 of 1910 describes such an objective depending for its corrections on the use of four lenses of the same refractive index for the principal color. Rigorous computation shows that a substantial improvement can be obtained by departing from such a limitation of the refractive index. For an objective of aperture F/4.5, for example, the widest anastigmatically flat field is obtained only by making the negative components of glass of the lowest available refractive index consistent with the degree of dispersive power required.

British patent specification No. 833 of 1913 describes an objective consisting of four simple glasses in which the coma aberration is corrected by making the two surfaces of each negative lens of different curvatures and placing them unsymmetrically with respect to the diaphragm one of them presenting its deeper curve and the other its shallower curve to the diaphragm. Rigid calculation shows that, by a different arrangement, a substantial improvement is obtained in the correction of astigmatism, field curvature and coma.

The method of the present invention is to arrange both negative lenses with their shallow faces presented to the middle air space. This arrangement necessitates a shallower curve for the inner surface of the back positive lens, which re-acts very favorably on the field curvature and astigmatic aberrations at the margin of the field and at the same time yields a high degree of coma correction throughout the field.

Figure 2:
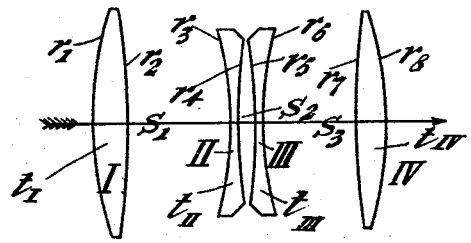

I will further describe the invention with reference to the accompanying drawing in which Figure 1 is a diagrammatic illustration of one form or example of a photographic objective constructed and arranged according to the invention and showing the relative positions, curvatures and thicknesses of the lenses composing the objective, and Fig. 2 is a similar illustration of a second example.

I give below the constructional data for the two objectives illustrated in the drawing. Both are specified in terms of unit focal length. The sign convention used is that $+$ is attached to surfaces convex toward the incident light and $-$ to surfaces concave to the incident light:—

*Example I.* (*Fig. 1.*)  F/4.5. Equivalent focal length 1.00.

| Radii. | Thicknesses and air spaces. |
|---|---|
| $r_1 + .2976$ | $t_1$ .0455 |
| $r_2 - .9152$ | $S_1$ .0203 |
| $r_3 - .4285$ | $t_{II}$ .0100 |
| $r_4 + .4464$ | $S_2$ .0362 |
| $r_5 - .5041$ | $t_{III}$ .0100 |
| $r_6 + .4330$ | $S_3$ .0193 |
| $r_7 + .8152$ | $t_{IV}$ .0455 |
| $r_8 - .2976$ | |

Kinds of glass.

| | | | |
|---|---|---|---|
| I | $n_D = 1.6116$ | $V = 56.4$ | Dense baryta crown |
| II | $n_D = 1.5682$ | $V = 43.4$ | Light flint |
| III | $n_D = 1.5502$ | $V = 45.8$ | Light flint |
| IV | $n_D = 1.6116$ | $V = 56.4$ | Dense baryta crown |

*Example II.* (*Fig. II.*)  F/4.5.  Equivalent focal length 1.00.

| Radii. | Thicknesses and separations. |
|---|---|
| $r_1 +$ .3409 | $t_1$ .0257 |
| $r_2 -$ 4.081 | $S_I$ .1089 |
| $r_3 -$ .4143 | $t_{II}$ .0090 |
| $r_4 +$ 1.049 | $S_2$ .0142 |
| $r_5 -$ 14.40 | $t_{III}$ .0090 |
| $r_6 +$ .3698 | $S_3$ .0909 |
| $r_7 +$ 1.336 | $t_{IV}$ .0265 |
| $r_8 -$ .3352 | |

Kinds of glass.

| I | $n_D = 1.6116$ | $V = 56.4$ | Dense baryta crown |
| II | $n_D = 1.6206$ | $V = 36.2$ | Heavy flint |
| III | $n_D = 1.6206$ | $V = 36.2$ | Heavy flint |
| IV | $n_D = 1.6116$ | $V = 56.4$ | Dense baryta crown |

Example I attains a wide field highly corrected for the aberrations of coma, astigmatism and curvature at an aperture of F/4.5 by the use of highly refractive baryta crown glass for the positive lenses and of light flints of medium refractive index for the negative glasses.

Example II shows the invention applied to a design intended for objectives of long focal length in which it is necessary to attain a very high degree of correction of the aberrations over a field of moderate extent. In the particular example quoted, the negative lenses are made of material of refractive index higher than that of the positives. This is immaterial to the application of my invention. If one of the negative lenses were made of material of somewhat higher, and the other of material of somewhat lower, refractive index than that of the positive lenses, a compensating effect could be obtained by suitable adjustments of the various curvatures and air spaces. As in Example I, the essential points to secure a high degree of correction of the several aberrations are those embodied in my invention, viz:—the employment of highly refractive material for the positive lenses and the favorable distribution of the unsymmetrical curvatures so that all the four glasses turn their surface of least curvature toward the middle air space.

Having thus fully described the nature of my invention and the best means I know for carrying the same into practical effect, I claim:—

1. A spherically, chromatically, astigmatically and comatically corrected photographic objective consisting of two halves separated by a centrally disposed or median air space, each half comprising a positive lens of baryta crown of high refractive index, and a negative lens, the two halves being unsymmetrical as regards the negative lenses and the two lenses of each half being separated by an air space of the shape of a positive meniscus, and the two less curved surfaces of the lenses of each half facing inward toward the said median air space.

2. A spherically, chromatically, astigmatically and comatically corrected photographic objective consisting of two halves separated by a centrally disposed or median air space, each half comprising a positive lens of baryta crown of high refractive index and a negative lens of lower refractive index, the two halves being unsymmetrical as regards the negative lenses and the two lenses of each half being separated by an air space of the shape of a positive meniscus, the less curved surfaces of the lenses of each half facing inward toward the said median air space.

In testimony whereof I have signed my name to this specification in the presence of two subscribing witnesses.

ARTHUR WARMISHAM.

Witnesses:
T. E. HUDSON,
P. E. CHAWNER.